United States Patent [19]

Lagle, III et al.

[11] Patent Number: 5,715,248
[45] Date of Patent: Feb. 3, 1998

[54] DERIVATION OF VT GROUP CLOCK FROM SONET STS-1 PAYLOAD CLOCK AND VT GROUP BUS DEFINITION

[75] Inventors: Hugh Andrew Lagle, III; Duane Richard Remein; James Michael Preston, all of Raleigh; William Christian Staton, Cary; William B. Weeber, Apex, all of N.C.

[73] Assignee: Alcatel Network Systems, Inc., Richardson, Tex.

[21] Appl. No.: 886,723

[22] Filed: May 21, 1992

[51] Int. Cl.⁶ .................................................. H04J 3/00
[52] U.S. Cl. ........................ 370/366; 370/476; 370/506; 370/535
[58] Field of Search ........................ 370/357, 360, 370/366, 465, 472, 476, 503, 505, 506, 509, 510, 516, 522, 535

[56] References Cited

U.S. PATENT DOCUMENTS

| | | | |
|---|---|---|---|
| 4,967,405 | 10/1990 | Upp et al. | 370/112 |
| 5,060,229 | 10/1991 | Tyrrell et al. | 370/110.1 |
| 5,091,907 | 2/1992 | Wettengel | 370/99 |
| 5,111,485 | 5/1992 | Serack | 370/102 |
| 5,131,013 | 7/1992 | Choi | 370/102 |
| 5,136,587 | 8/1992 | Obana et al. | 370/112 |

*Primary Examiner*—Alpus H. Hsu
*Attorney, Agent, or Firm*—Ware, Fressola, Van Der Sluys & Adolphson, LLP

[57] ABSTRACT

A SONET formatter circuit (10) receives a parallel STS-1 TX signal (19) from a highspeed interface module. The STS-1 TX signal (19), which contains a floating VT group payload, is demultiplexed into seven parallel VT groups (33). These seven parallel VT groups (33) are converted to serial by a parallel to serial converter (34) and transmitted serially to lowspeed interface modules as DEMUX direction VT group data signals (42, 43). The SONET formatter circuit (10) also receives serial MUX direction VT group data signals (68, 69) from lowspeed interface modules. These serial VT group data signals (68, 69) are converted to seven parallel VT groups (89) by a serial to parallel converter (64). These seven parallel VT groups (89) are multiplexed with overhead data (84) into a parallel STS-1** RX signal (50) which is transmitted to a highspeed interface module. To maintain continuous VT group frame transmissions, a VT group clock generation circuit (72) is required.

4 Claims, 11 Drawing Sheets

| VT GROUP | STS-1 ** Column Number | | | | | | | | | |
|---|---|---|---|---|---|---|---|---|---|---|
| 1 | 4 | 11 | 18 | 25 | 33 | 40 | 47 | 54 | 62 | 69 | 76 | 83 |
| 2 | 5 | 12 | 19 | 26 | 34 | 41 | 48 | 55 | 63 | 70 | 77 | 84 |
| 3 | 6 | 13 | 20 | 27 | 35 | 42 | 49 | 56 | 64 | 71 | 78 | 85 |
| 4 | 7 | 14 | 21 | 28 | 36 | 43 | 50 | 57 | 65 | 72 | 79 | 86 |
| 5 | 8 | 15 | 22 | 29 | 37 | 44 | 51 | 58 | 66 | 73 | 80 | 87 |
| 6 | 9 | 16 | 23 | 30 | 38 | 45 | 52 | 59 | 67 | 74 | 81 | 88 |
| 7 | 10 | 17 | 24 | 31 | 39 | 46 | 53 | 60 | 68 | 75 | 82 | 89 |

FIGURE 6

| COL | 0 | 1 | 2 | 3 | 4 | 5 | 6 | 7 | 8 | 9 | 10 | 11 | ... | 31 | 32 | 33 | ... | 60 | 61 | 62 | ... | 89 |
|---|---|---|---|---|---|---|---|---|---|---|---|---|---|---|---|---|---|---|---|---|---|---|
| ROW 1–9 | SOH & LOH | | | POH | VTG 1 | VTG 2 | VTG 3 | VTG 4 | VTG 5 | VTG 6 | VTG 7 | VTG 1 | ... | VTG 7 | STUFF | VTG 1 | ... | VTG 7 | STUFF | VTG 1 | ... | VTG 7 |

DERIVATION OF VT GROUP CLOCK FROM SONET STS-1 PAYLOAD CLOCK AND VT GROUP BUS DEFINITION

CROSS REFERENCE TO RELATED APPLICATIONS

This patent application discloses subject matter that is disclosed and claimed in copending U.S. Patent application Ser. Nos. 07/887,348, 07/887,156, 07/886,755, 07/886,724 and 07/886,789 which were filed on the same date as this application and are hereby incorporated by reference.

TECHNICAL FIELD

This invention relates to telecommunications and, more particularly, to timing in a network element for a synchronous optical network (SONET).

BACKGROUND OF THE INVENTION

A SONET synchronous transport signal level one (STS-1) frame contains a synchronous payload envelope (SPE) that is divided into seven virtual tributary (VT) groups as defined by Bellcore document TR-NWT-253. Each STS-1 frame is transmitted serially at a rate of 51.84 megabits per second (Mbit/second) while each of the seven VT groups are desired to be transmitted serially at a rate of 6.912 Mbit/second. The 6.912 Mbit/second VT group rate is desirable so as to maintain continuous VT group frame transmissions after stripping out unneeded STS-1 frame transport overhead bytes and STS-1 SPE path overhead and stuff bytes. A problem occurs, however, in generating a 6.912 MHz VT group clock that is 8 kHz frame synchronous to a highspeed 51.84 MHz STS-1 clock because 6.912 MHz is a non-integer ratio of 51.84 MHz.

One way the pre-SONET prior art might have approached such a problem might have been to use a phase lock loop (PLL) circuit to generate a VT group clock. However, a PLL circuit introduces additional complexity (gate count and area) to clock generation circuitry, as opposed to a simple synchronous divider.

The VT group clock generation problem is manifested due to the fact that the SONET STS-1 SPE is divided into seven VT groups, as defined by the above cited Bellcore document. Each of these VT groups can be further decomposed into the either a VT6, VT3, VT2 or VT1.5 type of VT group. Such VT group types are a natural consequence of the SONET STS-1 SPE, but there is no method defined in the Bellcore document for transporting these VT groups, or these VT group types, as separate entities.

One method of transporting a VT group is to transmit each VT group frame at a rate of one seventh or more the rate of an STS-1 frame. However, this would require a complicated gapping algorithm resulting in higher gate count and cost. Thus, a technique is required for transporting VT group frames at a desired rate of 6.912 Mbit/second so as to maintain continuous VT group frame transmissions.

DISCLOSURE OF THE INVENTION

According to the present invention, a VT group clock is provided by alternately dividing a highspeed STS-1 clock by eight and then by seven for an effective divide ratio of 7.5. In other words, one VT group clock period will be eight clock cycles of the STS-1 clock and the next will be seven clock cycles of the STS-1 clock, with this pattern repeating. This division is performed because an STS-1 frame contains 810 bytes and each VT group frame contains 108 bytes, thus a divide ratio of exactly 7.5. The insight of the present invention is therefore to provide this non-integer divide ratio by alternately dividing the STS-1 clock by different integer values (i.e., seven and eight).

In further accord with the present invention, VT groups are treated independently of corresponding STS-1 frames. Each VT group contains 108 bytes of information per 8 kHz frame with a 4 frame 2 kHz multiframe sequence (superframe) composing a complete VT group signal. Since each VT group is treated independently of a corresponding STS-1 frame, each VT group signal is demultiplexed by stripping out STS-1 frame transport overhead bytes and STS-1 SPE path overhead and stuff bytes and then transported elsewhere for further processing. Each of these VT group signals are transmitted serially at a rate of 6.912 Mbit/second which, as noted above, has a divide ratio of 7.5 from the STS-1 signal rate of 51.84 Mbit/second.

Furthermore, there is no inherent framing information within a VT group as there is within an STS-1 frame. Therefore, a separate 2 kHz framing signal is passed along with each VT group signal to denote the four frame superframe by the location of the V4 VT payload pointer byte. Also, the V4 VT payload pointer byte is unused in the VT group structure, so a bit is robbed as a parity bit to check the integrity of the VT group signals.

These simple approaches result in greatly reduced cost and circuit complexity. They allow a simple method of multiplexing/demultiplexing an STS-1 frame from/to VT groups, respectively, and of transmitting VT group signals in a timing defined manner. The only disadvantage is that the VT group clock has an uneven duty cycle with an alternately varying period.

The object of the present invention is to provide a means for generating a VT group clock that is frame synchronous to a highspeed STS-1 clock.

Another object of the present invention is to provide a method for transporting VT groups as separate entities.

Another object of the present invention is to define the method for transporting VT groups as separate entities as a standard VT group bus.

These and other objects, features and advantages of the present invention will become more apparent in light of the following detailed description of a best mode embodiment thereof, as illustrated in the accompanying drawings.

BEST MODE FOR CARRYING OUT THE INVENTION

Figure 1:
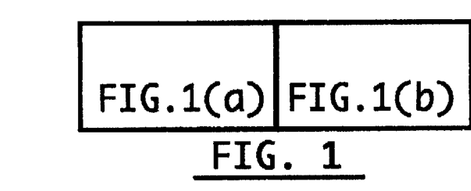
FIGS. 1(a) and 1(b) together show a top level block diagram for a SONET formatter circuit (SFMT), according to the present invention.
Figure 1A:
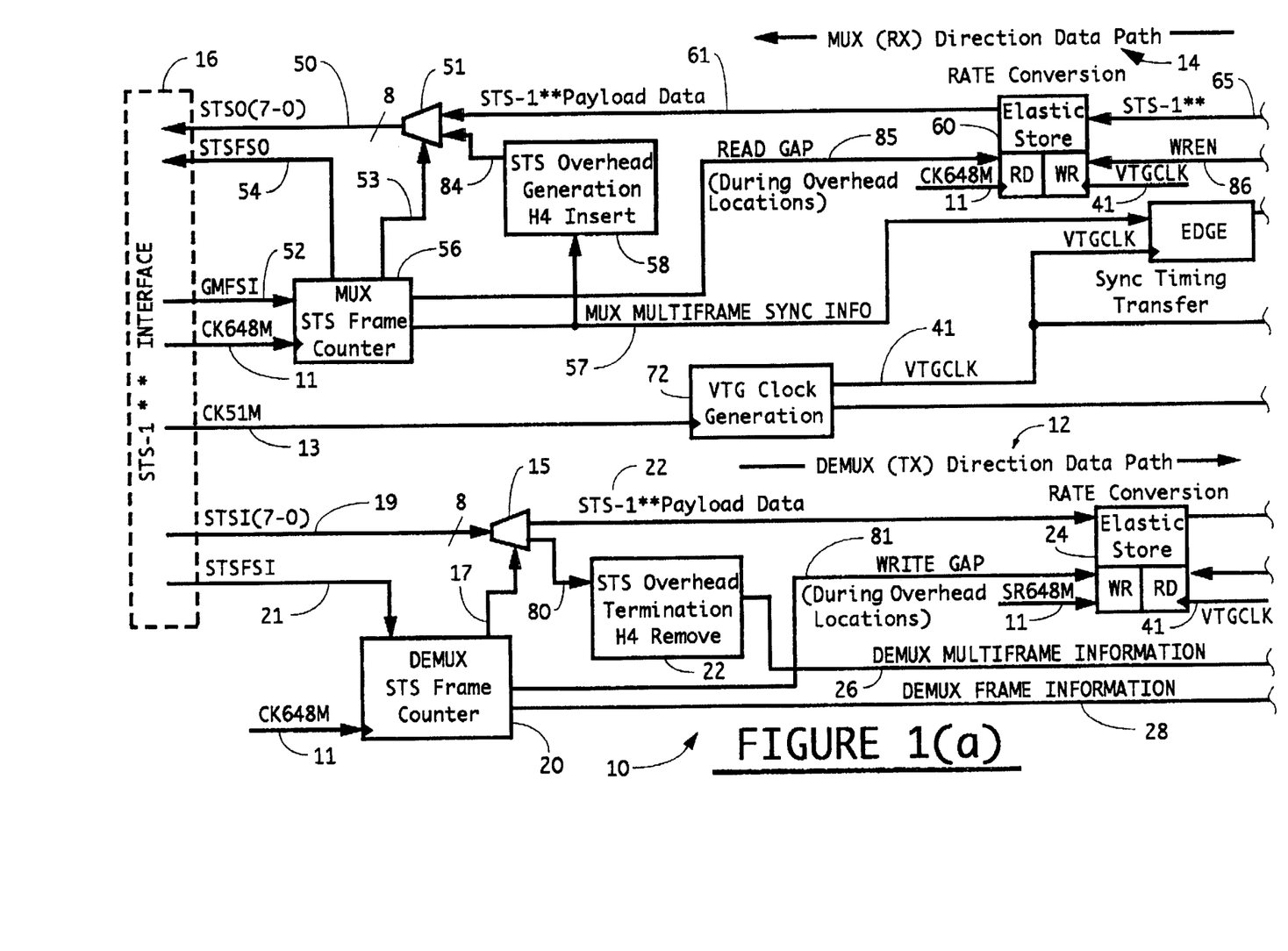
Figure 1B:
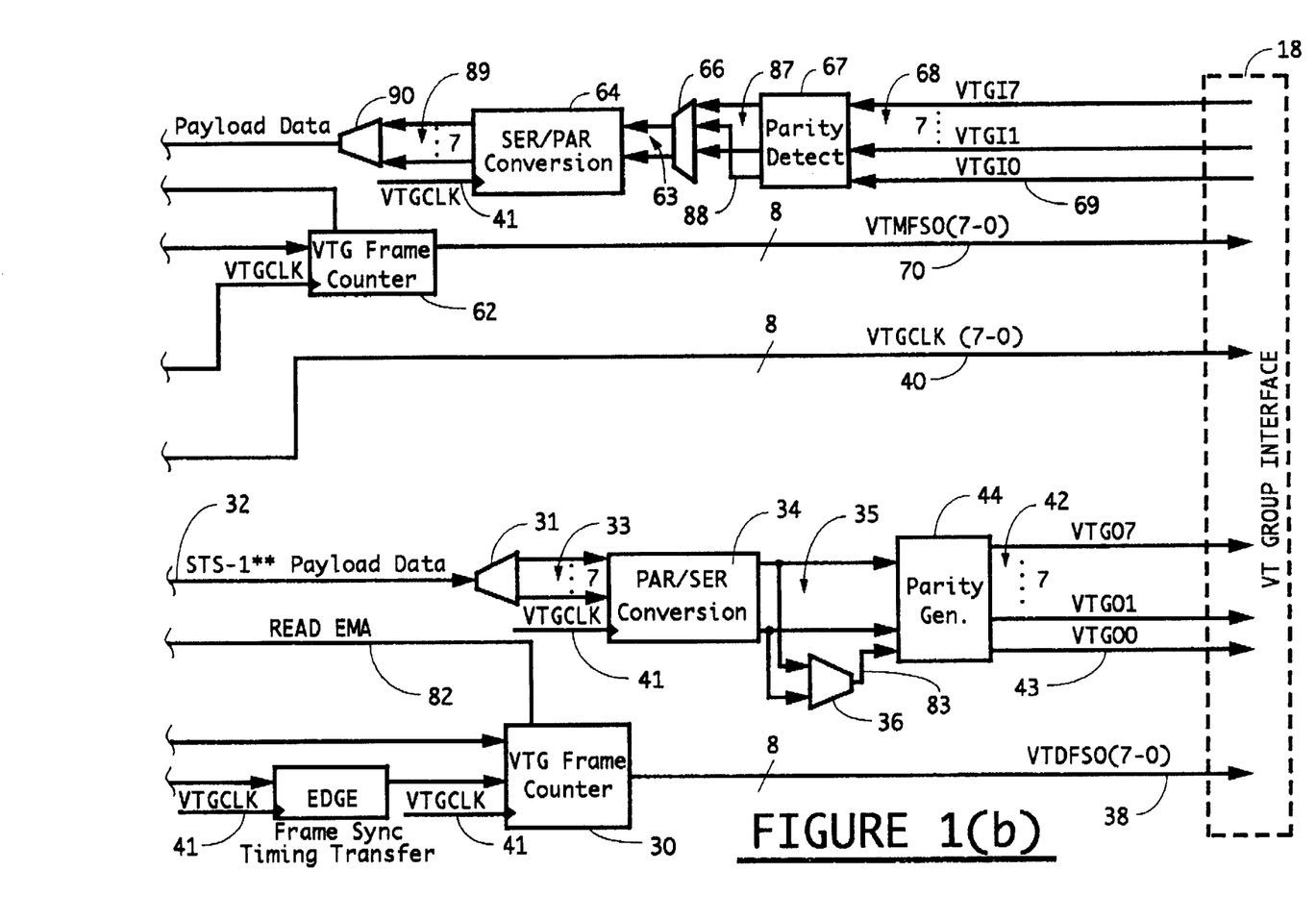

FIGS. 1(a) and 1(b) together show a SONET formatter circuit (SFMT), generally indicated by the numeral 10, for interfacing between an 8-bit parallel STS-1 signal at 6.48 Mbit/second on the left hand side of the Figure and 7 serial VT group signals plus 1 serial VT group protection channel at 6.912 Mbit/second on the right hand side of the Figure. A parallel STS-1 signal is a derivative of a serial STS-1 signal, as will be explained. An overview of the SFMT 10 is briefly described as follows.

The major function of the SFMT 10, according to the present invention, is to provide a multiplexer/demultiplexer interface between an STS-1 signal, with a VT group payload, and seven constituent VT group signals. There is a fixed mapping between the STS-1 signal and the VT group signals, thus no VT Pointer processing is required. The only requirement of the SFMT 10 is that the STS-1** signal VT group payload be fixed with an H1*, H2* pointer value of 522 or other selected value so as to allow VT group payload columns to be frame aligned.

It is intended, according to the present invention, that the SFMT 10 interface between a SONET element highspeed cross-connect module and 8 DS1 lowspeed modules (one being a redundant module) with 4 DS1's per module. The architecture of the SFMT 10 is independent of VT type such that it can accommodate one VT6, two VT3's, three VT2's or four VT1.5's in any given VT group. One VT group signal is directed to each of the 8 DS1 lowspeed modules. A 1:7 equipment protection scheme is also provided for redundancy.

Data path direction terms used in this description are relative to a system in which the SFMT 10 might be used. Therefore, to eliminate any confusion in the reading of this description, the data path directions for the SFMT 10 are defined as follows:

STS-1** Transmit (TX) - highspeed toward lowspeed for the SFMT

STS-1** Receive (RX) - lowspeed toward highspeed for the SFMT

DEMUX - highspeed toward lowspeed for the SFMT

MUX - lowspeed toward highspeed for the SFMT

In the SFMT 10, STS-1 TX equates to a DEMUX direction 12 and STS-1 RX equates to a MUX direction 14.

In the highspeed to lowspeed (DEMUX) direction 12, the SFMT 10 receives a parallel STS-1 TX signal 19 from a high speed interface module. The STS-1 TX signal 19, which may contain a floating VT group payload, is demultiplexed into seven parallel VT groups 33, as defined by the Bellcore document TR-NWT-253. These seven parallel VT groups 33 are then converted into seven serial VT group signals 35 and are sent to a 1:7 equipment protection mux 36 where one of the seven serial VT group signals 35 is used as a protection channel for redundancy. The resulting eight serial VT group signals 42, 43 are then transmitted serially to lowspeed interface modules.

In the lowspeed to highspeed (MUX) direction 14, the SFMT 10 receives eight serial VT group signals 68, 69 from a lowspeed interface module and sends them to a 1:7 equipment protection demux 66. One of the eight serial VT group signals 69 is a protection channel which can be used to replace one of the other seven serial VT group signals 68. The resulting seven serial VT group signals 63 are then converted into seven parallel VT groups 89 and multiplexed into a parallel STS-1 RX signal payload 61. Line, section and path overhead is added to the parallel STS-1 RX signal payload 61 and a resulting parallel STS-1** RX signal 50 is frame aligned to a global multiframe sync 52 for transmission to a highspeed interface module.

A description of the input and output signals to the SFMT 10 are now given. These signal descriptions directly correspond to the signals shown in FIGS. 1(a) and 1(b).

CK51M 13 is a 51.84 MHz clock input. The CK51M signal 13 is a highspeed STS-1 clock and has a nominal 50/50 ratio duty cycle. The CK51M signal 13 is divided within the SFMT 10 to generate 6.912 MHz effective rate VT group clocks 41, 40 for internal and external SFMT 10 functional use.

CK648M 11 is a 6.48 MHz clock input. The CK648M signal 11 has a nominal 50/50 ratio duty cycle. STS-1 TX signals 19 and STS-1 RX signals 50 are transmitted and received, respectively, synchronous to the falling edge of this clock input 11. This clock input 11 is the inversion of an STS-1 system clock. Note that the STS-1 system clock is not used by the SFMT 10, so it is not shown in FIGS. 1(a) and 1(b).

VTGCLK(7–0) 40 are VT group clock outputs. Each VTGCLK 40 operates at a 6.912 MHz effective rate. The VT group clock outputs 40 are synchronous to the 51.84 MHz clock input 13. Each VT group clock output 40 is formed by dividing the 51.84 MHz clock input 13 by 7.5. This is accomplished by alternately dividing by seven and then by eight. Each VT group clock output 40 has uneven clock cycle periods because of this. Clock cycles have alternating periods of 154 ns and 135 ns. All VT group clock outputs 40 are identical and are distributed to lowspeed interface modules point-to-point to avoid bus glitches during power-on insertion/removal of a lowspeed interface module.

STSI(7–0) 19 is an eight bit parallel data bus input for receiving STS-1 TX signal data. STSI (7–0) 19 operates at a rate of 6.48 MHz and is synchronous with the 6.48 MHz clock input 11. STS-1 TX signals 19 are clocked in on the falling edge of the 6.48 MHz clock input 11. STSI(7) is the MSB and STSI(0) is the LSB.

STSFSI 21 is a frame sync input for receiving STS-1 TX signal data. STSFSI 21 operates at an 8 kHz rate, and is synchronous with and clocked in on the falling edge of the 6.48 MHz clock input 11. STSFSI 21 is aligned with the A1 framing byte of a received STS-1 TX signal 19.

STSO(7–0) 50 is an eight bit parallel data bus output for transmitting STS-1 RX signal data. STSO(7–0) 50 operates at a rate of 6.48 MHz and is synchronous with the 6.48 MHz clock input 11. STS-1 RX signals 50 are clocked out on the falling edge of the 6.48 MHz clock input 11. STSO(7) is the MSB and STSO(0) is the LSB.

STSFSO 54 is an frame sync output for transmitting STS-1 RX signal data. STSFSO 54 operates at an 8 kHz rate, and is synchronous with and clocked out on the falling edge of the 6.48 MHz clock input 11. STSFSO 54 is aligned with the A1 framing byte of a transmitted STS-1 RX signal 50.

GMFSI 52 is a global multiframe sync signal. GMFSI 52 operates at a 2 kHz rate, and is synchronous with and clocked in on the falling edge of the 6.48 MHz clock input 11. This global multiframe sync signal 52 is used to synchronize an STS-1** RX output frame and the start of an H4* four frame multiframe sequence for an STS-1 RX output signal 50. The rising edge of this signal has a fixed relationship to the A1 byte of a transmitted STS-1 RX signal 50.

VTGO(7–0) 42, 43 are DEMUX direction 12 VT group serial data bus outputs. An STS-1** TX signal 19 is demultiplexed into seven 108 byte VT groups and sent out serially on seven of these VT group output signals 42 at an average rate of 6.912 MHz. Data is clocked out of the SFMT 10 on the rising edge of the VT group clock outputs 40 and latched into lowspeed interface modules on the falling edge of the VT group clock outputs 40. The VT groups contained in the seven VT group output signals 42 are payload independent and may carry four DS-1's (VT1.5), three 2Mb's (VT2), two DS-1C's (VT3), or one DS2 (VT6). An eighth VT group output signal 43 (VTGO(0)) is an equipment protection channel and is selected from one of the other seven VT group output signals 42 for redundancy. Each of the eight DEMUX VT group output signals 42, 43 are aligned to a separate VTDFSO frame sync signal 38.

VTDFSO(7–0) 38 are DEMUX direction 12 VT group serial data bus sync signals. Each VTDFSO 38 operates at a 2 kHz rate, and is synchronous with and is clocked out on the rising edge of the 6.912 MHz effective rate VT group clock outputs 40. Each VTDFSO 38 signal is aligned with the last byte (108) of a corresponding DEMUX direction VT group serial output signal 42, 43 payload during the third frame of the four frame multiframe sequence and is used to inform a lowspeed interface module of the start (byte 1 of the fourth frame) of a VT group transmission and the correct four frame multiframe timing. These sync signals 38 are high for the first seven clock cycles of byte 108 and low for the last clock cycle and change on the rising edge of the VT group clock outputs 40. All VTDFSO signals 38 are identical and are sent to lowspeed interface modules point-to-point to avoid bus glitches during power-on insertion/ removal of a lowspeed interface module.

VTGI(7–0) 68, 69 are MUX direction 14 VT group serial data bus inputs. VT group data from the eight 108 byte VT group serial input signals 68, 69 is received synchronously with the 6.912 MHz effective rate VT group clock outputs 40. Data is clocked out of lowspeed interface modules on the rising edge of the VT group clock outputs 40 and is latched into the SFMT 10 on the falling edge of the VT group clock outputs 40. One of the VT group serial input signals 69 (VTGI(0)) is an equipment protection channel and, if selected, can replace one of the other seven VT group serial input signals 68 prior to multiplexing into a parallel STS-1** RX signal payload 61. All eight MUX VT group input signals 68, 69 are aligned to a separate VTMFSO frame sync signal 70.

VTMFSO(7–0) 70 are MUX direction 14 VT group serial data bus sync signals. Each VTMFSO 70 operates at a 2 kHz rate, and is synchronous with and clocked out on the rising edge of the 6.912 MHz effective rate VT group clock outputs 40. Each VTMFSO signal 70 is aligned with the last byte (108) of a corresponding MUX direction VT group serial input signal 68, 69 payload during the third frame of the four frame multiframe sequence and is used to inform a lowspeed interface module when to start (byte 1 of the fourth frame) a VT group transmission and the correct four frame multiframe timing. These sync signals 70 are high for the first seven clock cycles of byte 108 and low for the last clock cycle and change on the rising edge of the VT group clock outputs 40. All VTMFSO signals 70 are identical and are sent to lowspeed interface modules point-to-point to avoid bus glitches during power-on insertion/removal of a lowspeed interface module.

The SFMT 10 can most easily be understood by first describing its functional interfaces and then describing its internal components. The SFMT 10 has two basic functional interfaces, an STS-1 interface 16 and a VT group interface 18. The STS-1 interface 16 will be described first, followed by the VT group interface 18 description and the description of the SFMT 10 internal components.

The STS-1 interface 16 allows for transmission and reception of STS-1 signals. The format and information content of an STS-1 signal is, in general, the same as a SONET STS-1 signal, as defined in Bellcore TR-NWT-253, with the exception that several of the overhead bytes are either unused or generated for internal use. Each STS-1 signal is accompanied by an 8 kHz frame sync signal (STSFSO 54, STSFSI 21) to identify the location of an STS-1 signal frame. Also, no part of an STS-1 signal is scrambled.

An STS-1 signal is implemented as an 8-bit wide, STS-1 byte oriented, parallel signal. Therefore, to interface with an STS-1 signal, an 8-bit wide STS-1 parallel interface (STSO(7–0) 50, STSI(7–0) 19) is required. The byte boundaries of the STS-1 interface are defined such that SONET framing bytes, overhead bytes and payload bytes are transferred in a single clock cycle. The clock rate of an STS-1 signal is 6.48 MHz (51.84 MHz divided by 8 bits per byte) as defined by a STS-1 system clock. This STS-1 system clock is inverted (external to the SFMT) to generate the CK648M input 11. In the SFMT 10, each STS-1 signal byte is clocked in and clocked out on the falling edge of the CK648M input 11. The location of the STS-1 signal frame is indicated by the 8 kHz frame sync signals STSFSO 54 and STSFSI 21 which are aligned with the A1 framing byte and are synchronous to the STS-1 system clock. A global multiframe sync is provided by a 2 kHz sync signal (GMFSI 52) that is synchronous to the STS-1** system clock and aligned with the falling edge of CK648M 11. The rising edge of GMFSI 52 occurs three 6.48 MHz clock cycles before every fourth A1 byte.

Figure 2:
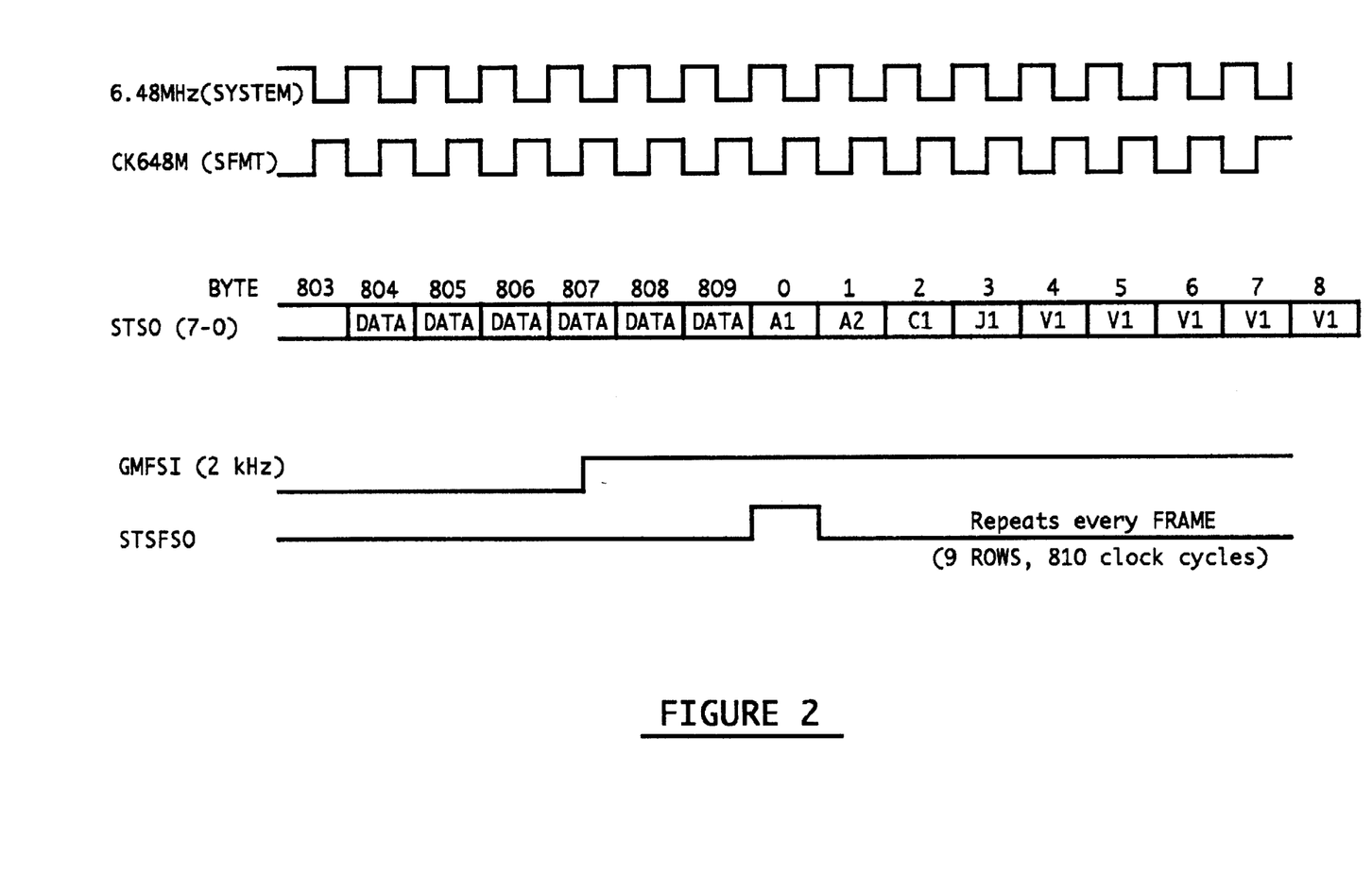
FIG. 2 shows STS-1** receive section (output) timing, according to the present invention.
Figure 3:
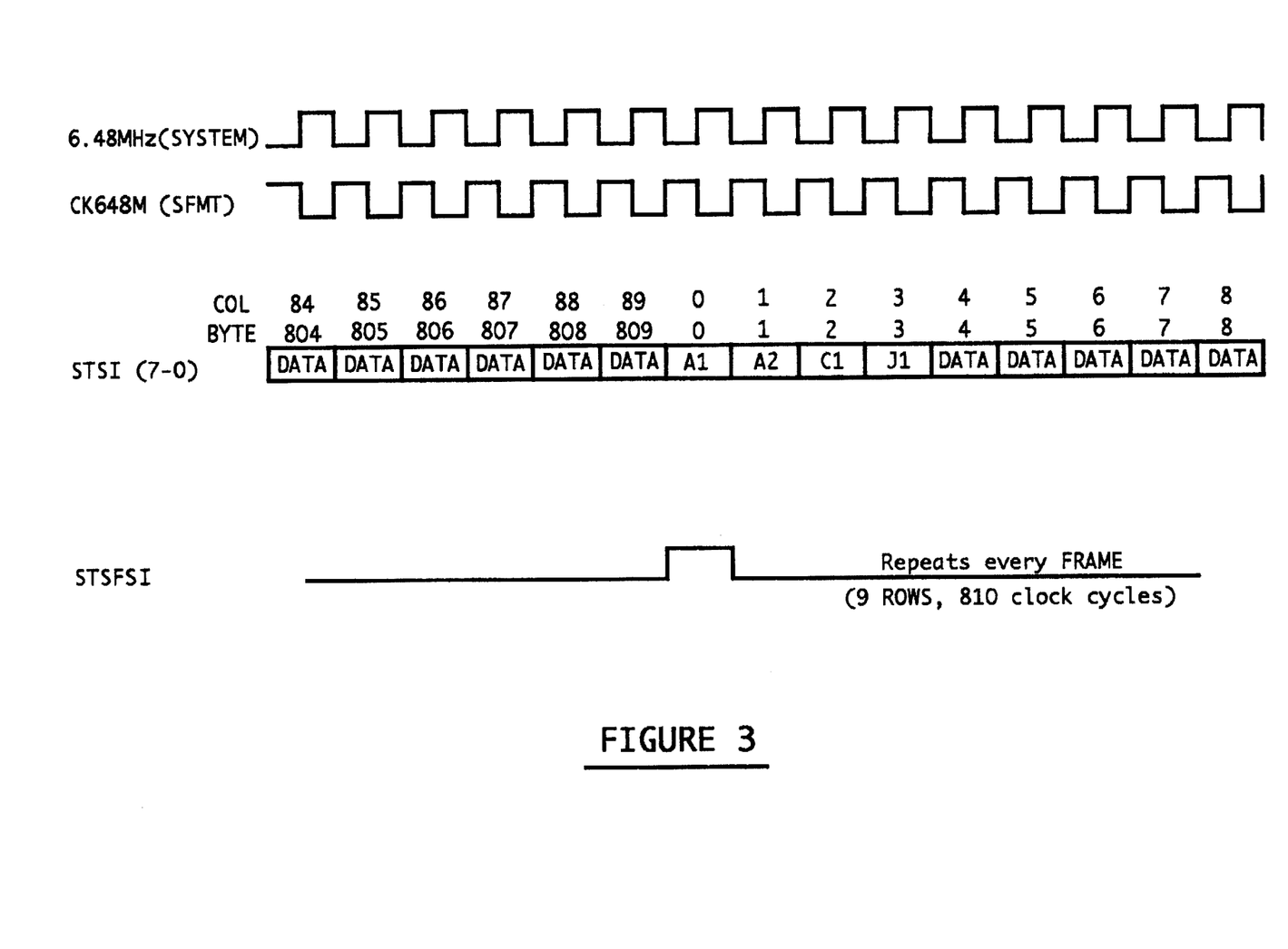
FIG. 3 shows STS-1** transmit section (input) timing, according to the present invention.

STS-1 RX output (MUX direction 14) data (STSO (7–0) 50) and the transmitted 8 kHz frame sync signal STSFSO 54 are aligned with GMFSI 52 to insure that all STS-1 RX frames are transmitted properly within the system. The timing of the STS-1 interface 16 in the receive (MUX) direction 14 is shown in FIG. 2. STS-1 TX input (DEMUX direction 12) data (STSI(7–0) 19) and the received frame sync signal STSFSI 21 are independent of GMFSI 52. The timing of the STS-1** interface 16 in the transmit (DEMUX) direction 12 is shown in FIG. 3.

The SFMT 10 generates the A1*, B2*, H1*, H2*, K1*, K2*, and H4* overhead bytes in the STS-1 RX output (MUX) direction 14, and all other overhead bytes are zero values. These overhead bytes are defined in the above-cited copending U.S. Patent application Ser. No. 07/886,724. In the STS-1 TX input (DEMUX) direction 12 only the B2*, K1*, K2*, and H4* bytes are used by the SFMT 10, and any other overhead bytes are ignored.

Figure 4:
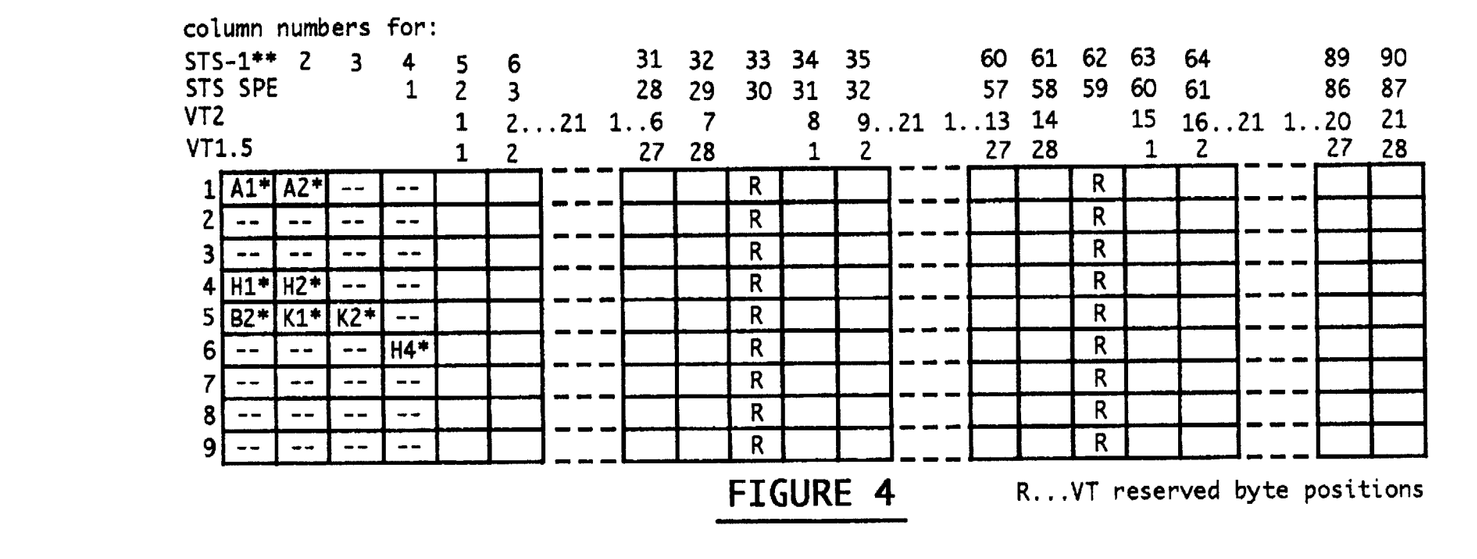
FIG. 4 shows the STS-1** frame structure mapping for VT group oriented payloads, according to the present invention.

Payload mapping for the STS-1 interface 16, as used by the SFMT 10, is shown in FIG. 4. Functional timing for the STS-1 interface 16 is shown below in Table 1.

TABLE-1

| STS1** Functional Timing | | |
|---|---|---|
| $T_{6mwckl}$ | clock width low 6.48 MHz clock | 77 ± 8 ns |
| $T_{6mwckh}$ | clock width high 6.48 MHz clock | 77 ± 8 ns |
| $T_{sugfs}$ | setup global frame sync to clk low | 10 ns |

TABLE-1-continued

| | STS1** Functional Timing | |
|---|---|---|
| $T_{susts}$ | setup STS-1** data/sync to clk low | 10 ns |
| $T_{hsts}$ | hold STS1-1** data/sync to clk low | 20 ns |
| $T_{pdrts}$ | clock low to STS-1** TX data/sync | 40 ns |

The VT group interface 18 allows SONET VT group information to be transferred between the SFMT 10 and eight lowspeed interface modules via a VT group bus. The VT group bus is composed of five signals; mux data (VTGI (7–0) 68, 69), demux data (VTGO(7–0) 42, 43), mux synchronization (VTMFSO(7–0) 70), demux synchronization (VTOFSO(7–0) 38) and clock (VTGCLK(7–0) 40). All of these signals are point-to-point with the eight lowspeed interface modules.

Figure 5:
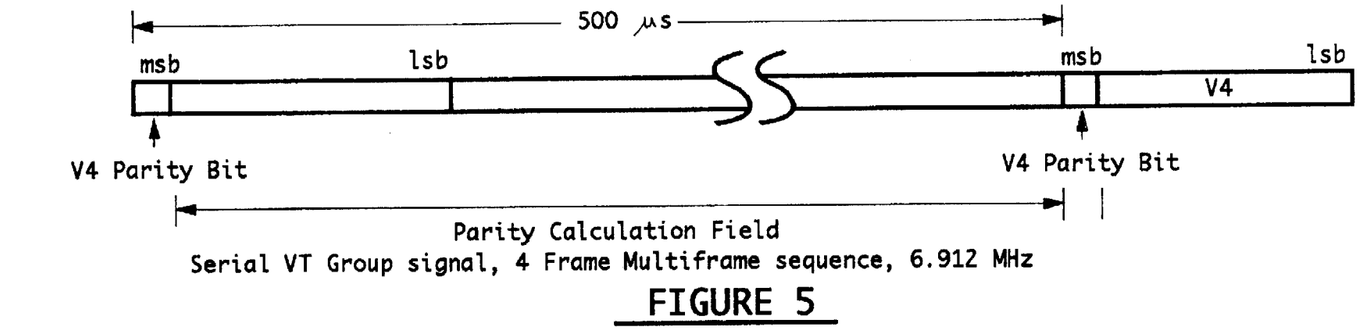
FIG. 5 shows VT group V4 parity bit insertion, according to the present invention.

Each VT group data signal 68, 69, 42, 43 transports the equivalent of one VT group (108 bytes per 125 µs frame). Odd parity for the VT group data signals 68, 69, 42, 43 is calculated and inserted in an unused V4 time slot. FIG. 5 shows such V4 parity calculations. Insertion of parity is provisionable to accommodate any future case where the use of the V4 byte may become defined. Parity is calculated from the bit after the MSB of V4 to the start of the next V4, as shown in FIG. 5. This parity is used to check the integrity of the VT group bus. The average rate of the VT group bus is 6.912 Mbit/second as provided by the VT group clock outputs 40. The VT group clock outputs 40 are derived from the 51.84 MHz clock input 13 by dividing it by 7.5 (alternately dividing by 7 and 8). The VT group synchronization signals 70, 38 are also derived from the 51.84 MHz clock input 13 via an internal VT group clock 41.

Figure 6:
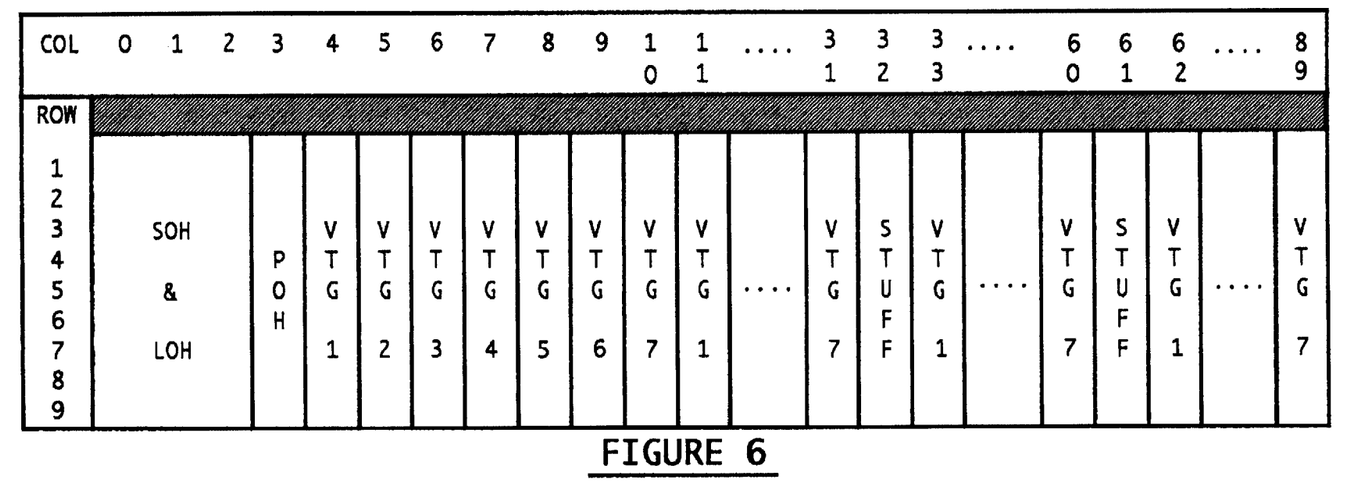
FIG. 6 shows the STS-1** frame structure, according to the present invention.
Figure 7:
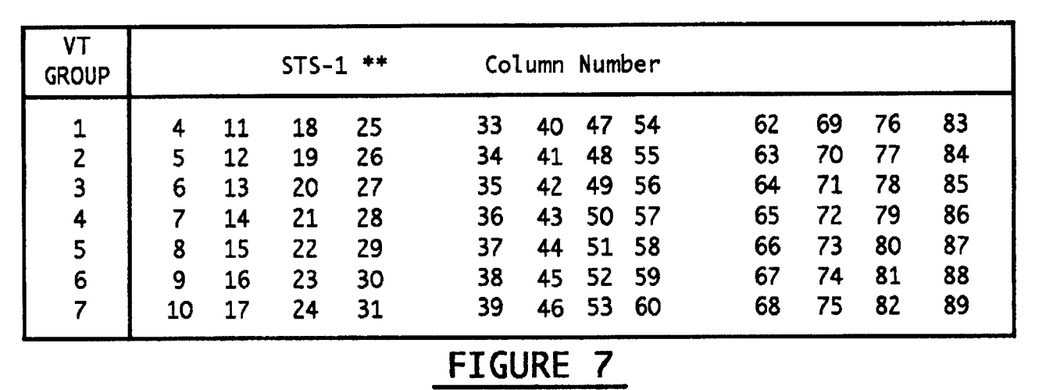
FIG. 7 shows STS-1** frame column assignments per VT group, according to the present invention.
Figure 8:
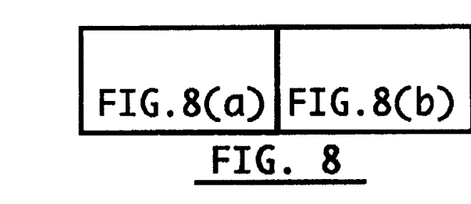
FIGS. 8(a) and 8(b) together show multiplexer VT group timing, according to the present invention.
Figure 8A:
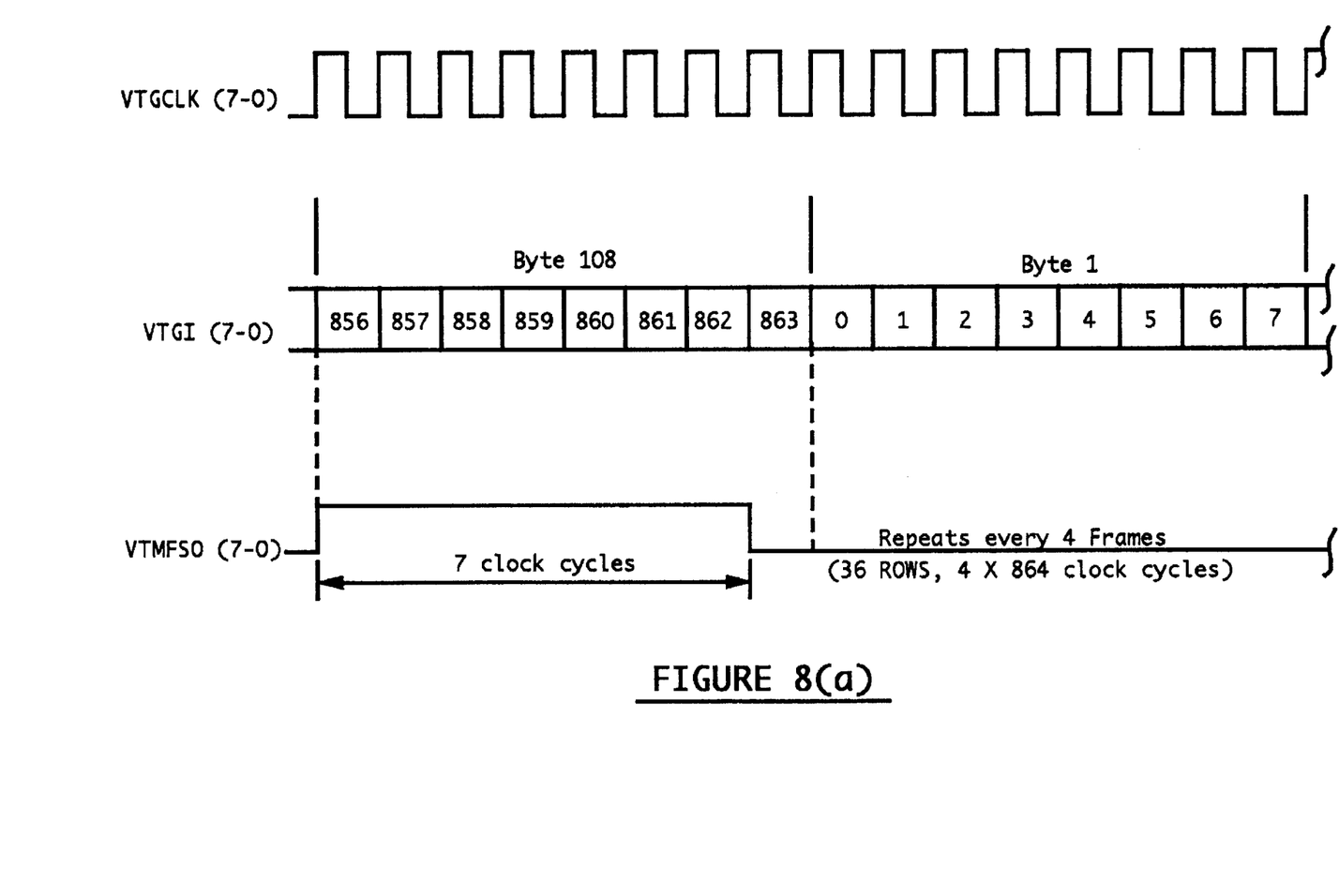
Figure 8B:
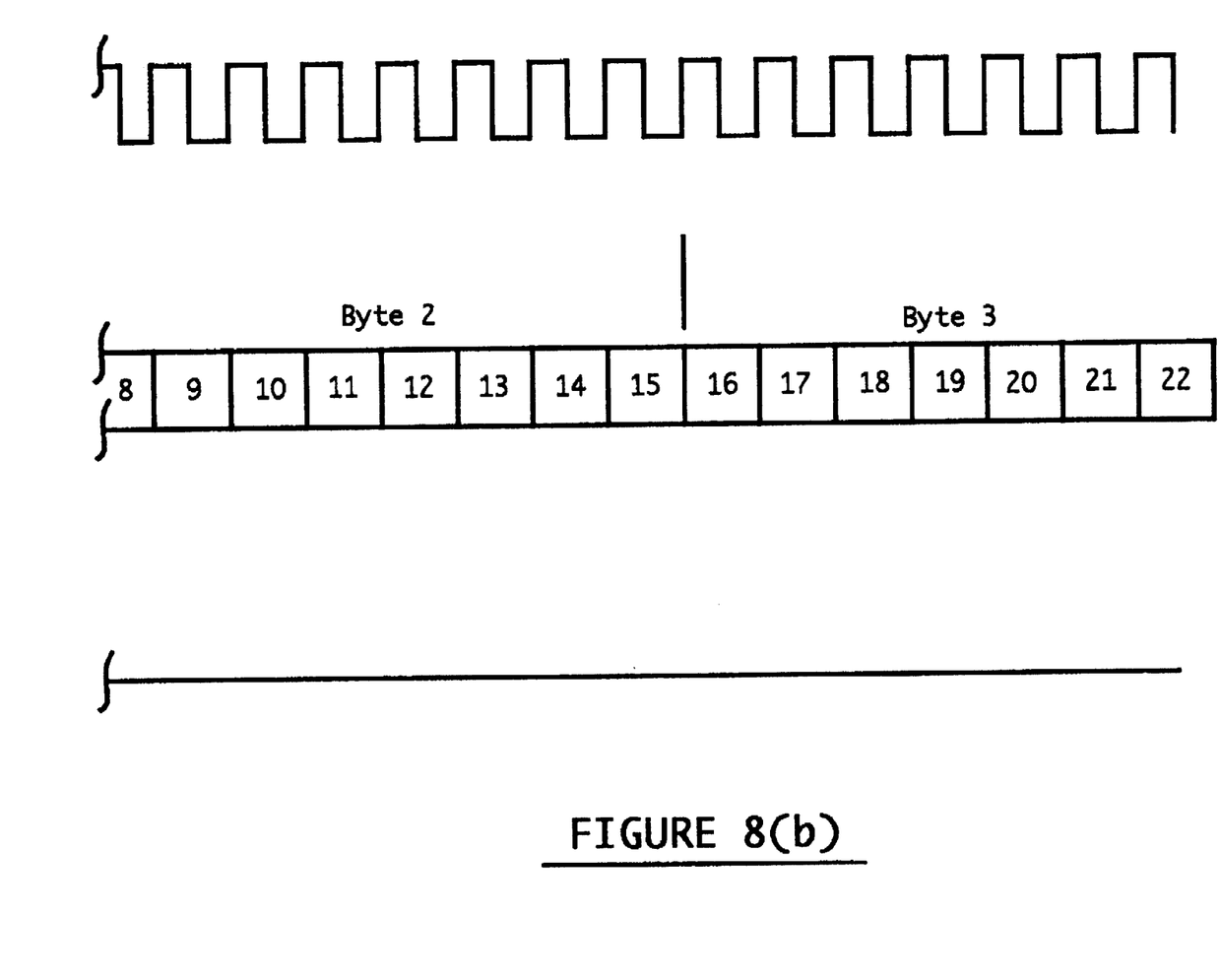
Figure 9:
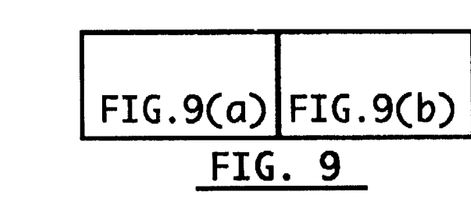
FIGS. 9(a) and 9(b) together show demultiplexer VT group timing, according to the present invention.
Figure 9A:
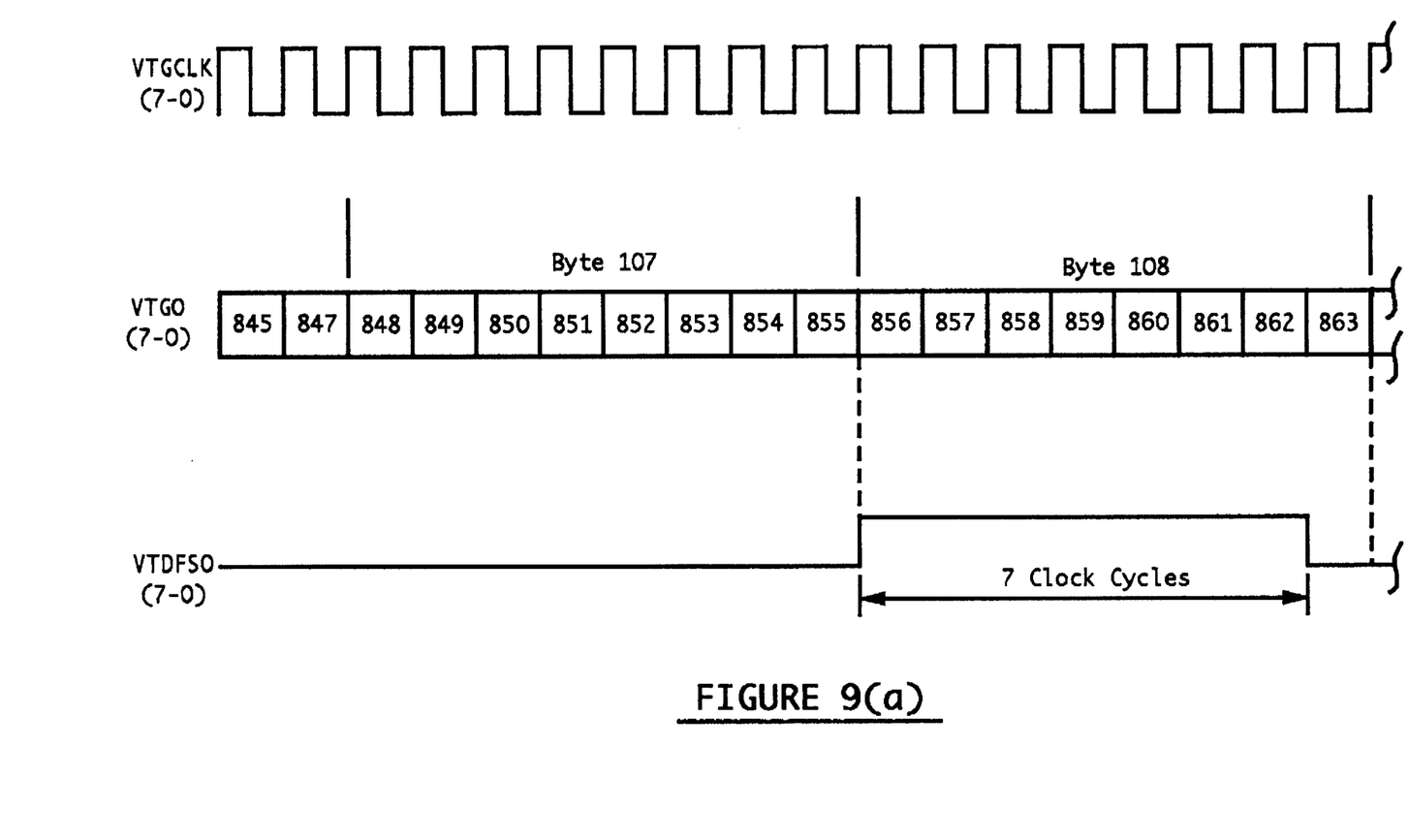
Figure 9B:
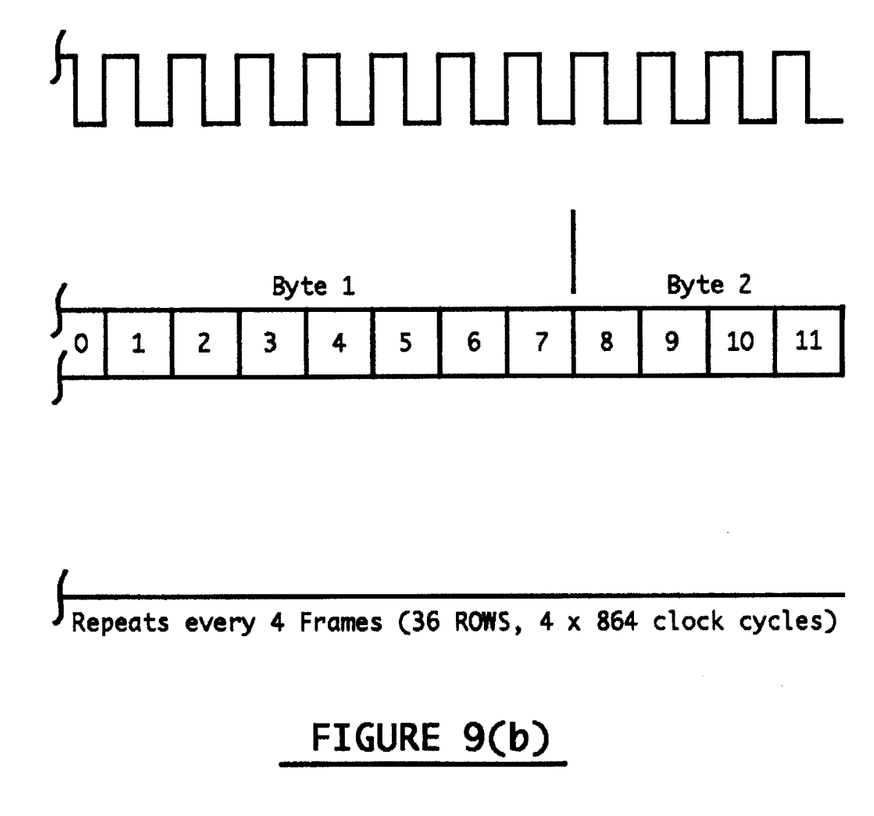

The frame structure of an STS-1 signal per VT group data signal 68, 69, 42, 43 is shown in FIG. 6. The column assignments of an STS-1 signal per VT group data signal 68, 69, 42, 43 are shown in FIG. 7. The timing of the VT group interface 18 in the receive (MUX) direction 14 is shown in FIGS. 8(a) and 8(b) which fit together as shown in FIG. 8. The timing of the VT group interface 18 in the transmit (DEMUX) direction 12 is shown in FIGS. 9(a) and 9(b) which fit together as shown in FIG. 9. Functional timing for the VT group interface 18 is shown in Table 2. Note that each VT group data signal 68, 69, 42, 43 contains 108 bytes per 125 µs frame and the VT group synchronization signals 70, 38 are aligned with the last byte of VT group byte 108 in every fourth frame (just prior to the V4 byte). Thus, VT group multiframe information is carried over the VT group mux 70 and demux 38 sync signals.

TABLE-2

| | VT Group Functional Timing | |
|---|---|---|
| $T_{7mwck}$ | clock period 6.912 MHz VTGCLK | 135/154 ns |
| $T_{7mwckl}$ | clock width low VTGCLK | 58/77 ns |
| $T_{7mwckh}$ | clock width high VTGCLK | 77 ns |
| $T_{pdvtd}$ | clock high to VTG data and sync | 40 ns |
| $T_{suvtd}$ | setup VTG data/sync to clock high | 30 ns |
| $T_{hvtd}$ | hold VTG data/sync from clock high | 0 ns |

With the STS-1** interface 16 and the VT group interface 18 now described, the internal components of the SFMT 10 will now be described.

In the transmit (DEMUX) direction 12, a DEMUX STS Frame Counter 20 receives a frame sync signal 21 to generate an STS-1 TX frame alignment signal 17 for identifying the frame positioning of an incoming STS-1 TX signal 19. The STS-1 TX signal 19 is demultiplexed through a first demultiplexer 15 whereby STS-1 TX overhead data 80 is sent to an STS Overhead Termination and H4 Remove circuit 22 and STS-1 TX Payload Data 23 is written sequentially, except during STS-1 TX signal overhead data time periods, into a DEMUX direction RATE Conversion Elastic Store 24. The DEMUX direction RATE Conversion Elastic Store 24 is controlled by a Write Gap signal 81 and a Read Enable signal 82. The H4* byte from the STS-1 TX overhead data 80 is used by the STS Overhead Termination and H4 Remove circuit 22 to obtain DEMUX Multiflame Sync Information 26. The DEMUX Multiframe Sync Information 26, along with DEMUX Frame Sync Information 28 from the DEMUX STS Frame Counter 20, is passed to a DEMUX VT Group Frame Counter 30. STS-1 TX Payload Data 32 at the output of the DEMUX direction RATE Conversion Elastic Store 24 is further demultiplexed through a second demultiplexer 31 into seven parallel VT groups 33 that are converted to serial VT group signals 35 by a Parallel to Serial Converter 34. A 1:7 protection mux 36 selects one of the seven serial VT group signals 35 as a redundant equipment protection signal 83 for a total of eight serial DEMUX direction VT group data signals 42, 43. Serial bit parity is calculated by a Parity Generator circuit 44 for each of the eight serial DEMUX direction VT group data signals 42, 43 over a four frame period and a parity bit is inserted into each unused V4 byte location. The VT Group Frame Counter 30 uses the DEMUX Multiframe Information 26 and the DEMUX Frame Information 28 to generate the 2 kHz demux multiframe synchronization signals 38 to locate the V1, V2, V3, an V4 bytes in the serial DEMUX direction VT group data signals 42, 43 and the correct multiframe order. The DEMUX direction VT group data signals 42, 43, the demux multiframe sync signals 38, and the VT group clock outputs 40 are all distributed point-to-point to lowspeed interface modules.

In the receive (MUX) direction 14, an STS-1 RX signal 50 is frame aligned to the global multiframe sync signal 52. This alignment is performed through the use of an STS-1 RX frame alignment signal 53 which ensures correct frame positioning of the STS-1 RX signal 50. The STS-1 RX frame alignment signal 53 along with MUX Multiframe Sync Information 57 are both generated by a MUX STS Frame Counter 56 upon receipt of the global multiframe sync signal 52. The MUX Multiframe Sync Information 57 is used to generate overhead data 84 through the use of a STS Overhead Generation and H4 Insert circuit 58. The MUX Multiframe Sync Information 57 is also passed to a MUX VT Group Frame Counter 62 which generates the 2 kHz mux multiframe synchronization signals 70 for lowspeed interface modules to send the V1, V2, V3 and V4 bytes in the serial MUX direction VT group data signals 68, 69 in the correct multiframe order. The eight serial MUX direction VT group data signals 68, 69 (seven plus one protection) are received and parity is calculated over a four frame period by a Parity Detector circuit 67. The calculated parity is compared with a parity bit that has been inserted into the V4 byte locations by the lowspeed interface modules. If a parity error is detected, a 1:7 protection mux 66 may replace one of the seven parity compared VT group signals 87 with the parity compared protection signal 88. The resulting seven serial VT group signals 63 are converted to seven parallel VT groups 89 by a Serial to Parallel Converter 64 and multiplexed through a first multiplexer 90 into parallel STS-1 RX Payload Data 65. The STS-1 RX Payload Data 65 is then written into a MUX direction RATE Conversion Elastic Store 60. The MUX direction RATE Conversion Elastic Store 60 is controlled by a Write Enable signal 86 and a Read Gap signal 85. The STS-1 RX Payload Data 61 is read from the MUX direction RATE Conversion Elastic Store 60 sequentially except during STS-1 RX signal overhead data time periods. STS-1** RX overhead 84, including a reconstructed H4* multiframe byte, is multiplexed with the STS-1 RX Payload Data 61 through a second multiplex 51 to reconstruct a complete STS-1 RX signal 50 which is then transmitted with the frame sync signal 54.

Figure 10:
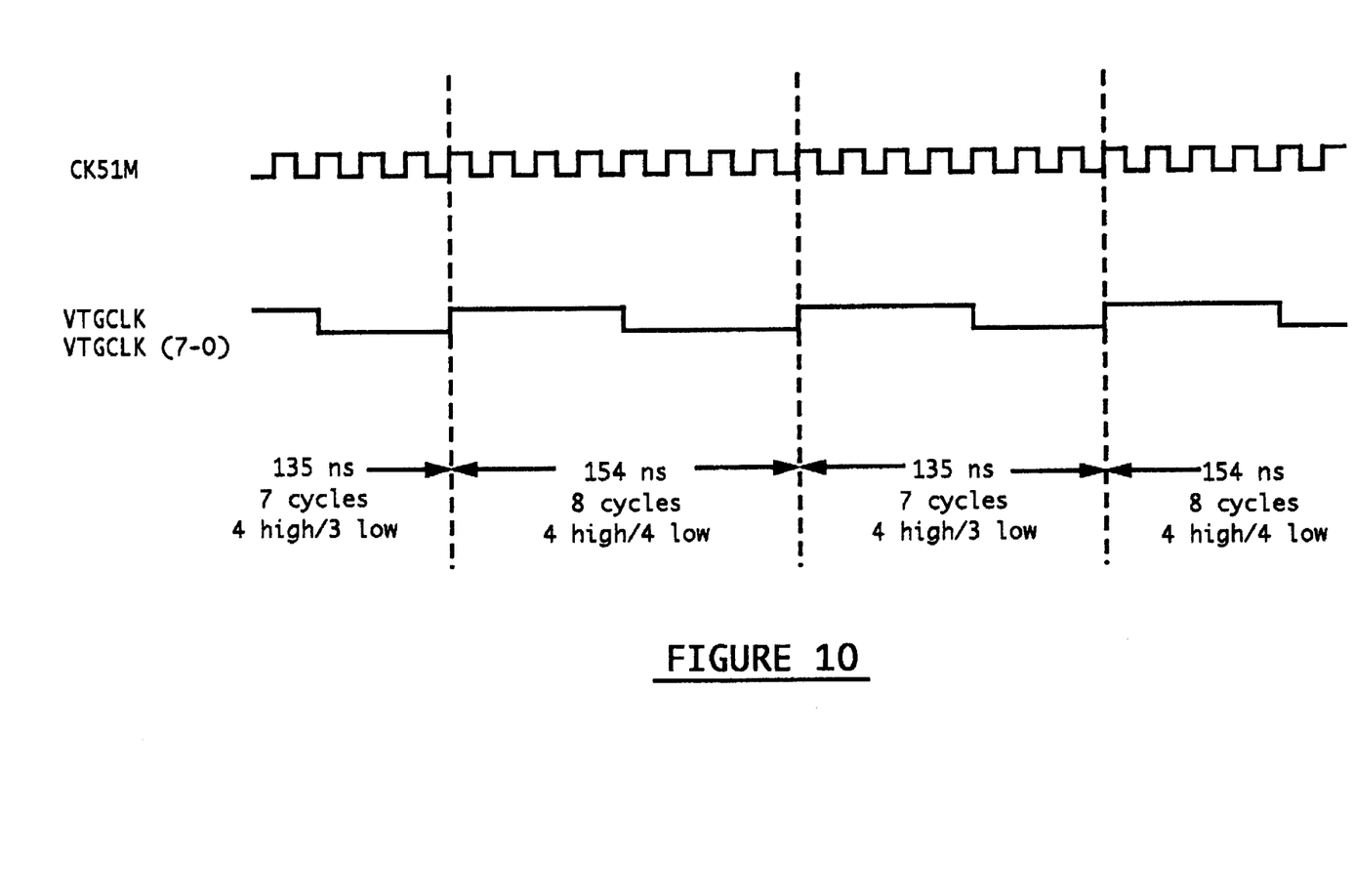
FIG. 10 shows a VT group clock divide by 7.5 circuit timing, according to the present invention.

Lastly, the SFMT 10 has a VT group clock generation circuit 72. The VT group clock generation circuit is used to generate 6.912 MHz VT group clocks 41, 40 for internal and external SFMT 10 functional use, respectively. The 6.912 MHz VT group clocks 41, 42 are generated by dividing the 51.84 MHz clock input 13 by 7.5 (divide by 8 and divide by 7 alternately). The VT group clocks 41, 42 have an alternating nominal duty cycle of 154 ns and 135 ns. The 154 ns cycle is high for four 51.84 MHz clock cycles and low for four cycles. The 135 ns cycle is high for four 51.84 MHz clock cycles and low for three cycles. A timing diagram of the VT group clocks 41, 42, are shown in FIG. 10. The 6.912 MHz clocks 41, 42 are synchronous with the 6.48 MHz clock input 11 since they are both directly derived from the 51.84 MHz clock input 13. They will have a fixed, but non-deterministic, phase relationship of fifteen 6.48 MHz clock cycles to sixteen 6.912 MHz clock cycles but, due to path propagation delay differences, no setup and hold times can be guaranteed between them. Thus, the RATE Conversion Elastic Store circuits 24, 60 are necessary to accommodate for timing boundaries.

It is thus seen that the objects set forth above are efficiently attained and, since certain changes can be made in the above described circuit and method without departing from the scope of the invention, it is intended that all matter contained in the above description or shown in the accompanying drawings shall be interpreted as illustrative and not in a limiting sense.

We claim:

1. A synchronous optical network (SONET) formatter circuit (SFMT) for use in a network element, comprising:

demultiplexer (DEMUX) data path direction (12) circuitry, responsive to a transmitted, parallel SONET, level one, synchronous transport (STS-1 TX) signal (19) for use internal to said network element, an STS-1 TX frame synchronization signal (21), a non-integer ratio virtual tributary (VT) group clock internal signal (41), and a level one, synchronous transport signal (STS-1**) clock input signal (11), for providing seven DEMUX data path direction serial VT group data signals (42) and at least one DEMUX data path direction VT group synchronization signal (38) corresponding to said seven DEMUX data path direction serial VT group data signals (42);

multiplexer (MUX) data path direction (14) circuitry, responsive to seven MUX data path direction serial VT group data signals (68), a multiframe synchronization signal (52), said non-integer ratio VT group clock internal signal (41), and said STS-1 clock input signal (11), for providing a received, parallel SONET, level one, synchronous transport (STS-1 RX) signal (50) for use internal to said network element, an STS-1** RX frame synchronization signal (54), and at least one MUX data path direction VT group synchronization signal (70) corresponding to said seven MUX data path direction serial VT group data signals (68); and a VT group clock generation circuit (72), responsive to a level one synchronous transport signal (STS-1) clock input (13), for providing said non-integer ratio VT group clock internal signal (41) and at least one non-integer ratio VT group clock output signal (40), wherein said at least one non-integer ratio VT group clock output signal (40) synchronously corresponds to said seven DEMUX data path direction serial VT group data signals (42) and said seven MUX data path direction serial VT group data signals (68).

2. The SFMT as defined in claim 1, wherein said DEMUX data path direction (12) circuitry comprises:

a DEMUX synchronous transport signal (STS) frame counter (20), responsive to said STS-1 TX frame synchronization signal (21) and said STS-1 clock input signal (11), for providing an STS-1** TX frame alignment signal (17), a DEMUX frame information signal (28), and a write gap signal (81);

a synchronous transport signal (STS) overhead termination and multiframe indicator (H4) remove circuit (22), responsive to an STS-1** TX overhead signal (80), for providing a DEMUX multiframe information signal (26);

a VT group frame counter (30), responsive to said DEMUX multiframe information signal (26), said DEMUX frame information signal (28), and said non-integer ratio VT group clock internal signal (41), for providing said at least one DEMUX data path direction VT group synchronization signal (38) and a read enable signal (82);

a DEMUX data path direction rate conversion elastic store (24), responsive to a parallel STS-1 TX payload data input signal (23), said STS-1 clock input signal (11), said non-integer ratio VT group clock internal signal (41), said write gap signal (81), and said read enable signal (82), for providing a parallel STS-1** TX payload data output signal (32);

a parallel to serial converter (34), responsive to seven parallel VT group signals (33) and said non-integer ratio VT group clock internal signal (41), for providing seven serial VT group signals (35); and a parity generator circuit (44), responsive to said seven serial VT group signals (35), for providing said seven DEMUX data path direction serial VT group data signals (42).

3. The SFMT as defined in claim 1, wherein said MUX data path direction (14) circuitry comprises:

a MUX synchronous transport signal (STS) frame counter (56), responsive to said multiframe synchronization signal (52) and said STS-1 clock input signal (11), for providing an STS-1 RX frame alignment signal (53), said STS-1** RX frame synchronization signal (54), a MUX multiframe synchronization information signal (57), and a read gap signal (85);

a VT group frame counter (62), responsive to said MUX multiframe synchronization information signal (57) and said non-integer ratio VT group clock internal signal (41), for providing said at least one MUX data path direction VT group synchronization signal (70) and a write enable signal (86);

a parity detector circuit (67), responsive to said seven MUX data path direction serial VT group data signals (68), for providing seven parity compared MUX data path direction serial VT group data signals (87);

a serial to parallel converter (64), responsive to a resulting seven MUX data path direction serial VT group data signals (63) and said non-integer ratio VT group clock internal signal (41), for providing seven parallel VT group signals (89);

a MUX data path direction rate conversion elastic store (60), responsive to a parallel STS-1 RX payload data input signal (65), said non-integer ratio VT group clock internal signal (41), said STS-1 clock input signal (11), said write enable signal (86), and said read gap signal (85), for providing a parallel STS-1 RX payload data output signal (61); and a synchronous transport signal (STS) overhead generation and multiframe indicator (H4) circuit (58), responsive to said MUX multiframe synchronization information signal (57), for providing an STS-1 RX overhead signal (84).

4. The SFMT as defined in claim 1, wherein said VT group clock generation circuit (72) comprises circuitry for dividing said STS-1 clock input (13) at 51.84 MHz by a non-integer ratio of 7.5 to generate said non-integer ratio VT group clock internal signal (41) and said at least one non-integer ratio VT group clock output signal (40) at 6.912 MHz.

* * * * *